No. 894,544. PATENTED JULY 28, 1908.
G. SIMON.
VEHICLE.
APPLICATION FILED MAR. 26, 1908.
Fig. 1.
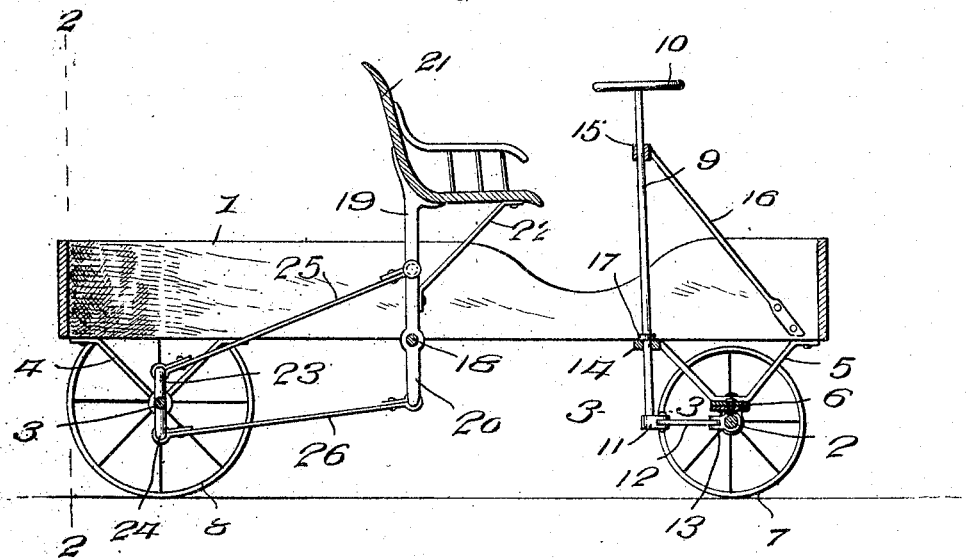
Fig. 2.
Fig. 3.
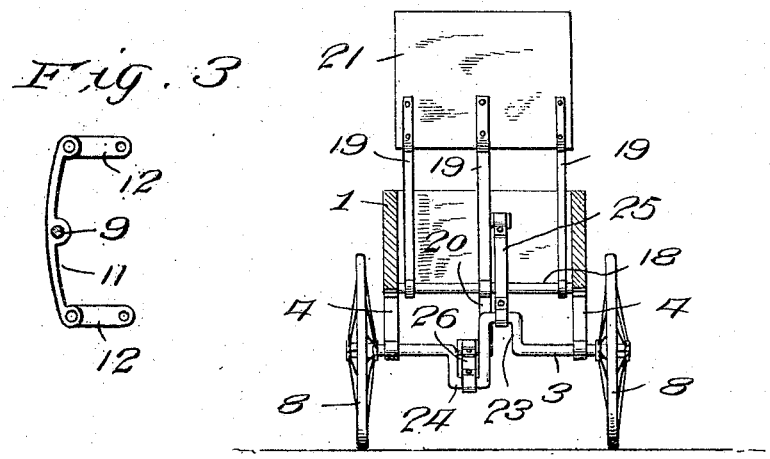
WITNESSES:
INVENTOR
G. Simon
BY
W. T. FitzGerald & Co.
Attorneys

UNITED STATES PATENT OFFICE.

GUSTAV SIMON, OF INDIANAPOLIS, INDIANA.

VEHICLE.

No. 894,544.

Specification of Letters Patent.

Patented July 28, 1908.

Application filed March 26, 1908. Serial No. 423,335.

*To all whom it may concern:*

Be it known that I, GUSTAV SIMON, a citizen of the United States, residing at Indianapolis, in the county of Marion and State of Indiana, have invented certain new and useful Improvements in Vehicles; and I do hereby declare the following to be a full, clear, and exact description of the invention, such as will enable others skilled in the art to which it appertains to make and use the same.

My invention relates to new and useful improvements in vehicles and more particularly to that class adapted to be manually propelled and my object is to provide a movable seat for the vehicle.

A further object is to provide means for connecting the rear axle of the vehicle with the seat, whereby when the seat is rocked, the vehicle will be propelled and a still further object is to provide a suitable guiding mechanism for the vehicle.

Other objects and advantages will be hereinafter referred to and more particularly pointed out in the claims.

In the accompanying drawings which are made a part of this application, Figure 1 is a longitudinal, vertical, sectional view through the vehicle. Fig. 2 is a sectional view as seen on line 2—2, Fig. 1, and, Fig. 3 is a sectional view as seen on line 3—3, Fig. 1.

Referring to the drawings in which similar reference numerals designate corresponding parts throughout the several views; 1 indicates the frame or base of my improved vehicle, below which are disposed front and rear axles 2 and 3, the rear axle 2 being rotatably mounted in brackets 4, which brackets are secured to the lower edges of the side bars of the frame 1, while the forward axle is carried by brackets 5 depending from the forward portion of the frame 1, a fifth wheel 6 being interposed between the brackets and axle 2, so that said axle may be readily swung to guide the vehicle, the usual or any preferred form of cushioned wheels 7 and 8 being mounted on the opposite ends, respectively, of the axles 2 and 3.

The front axle 2 is operated to guide the vehicle through the medium of a steering shaft 9, the upper end of said shaft being disposed a distance above the frame and provided with a hand wheel 10, while the lower end thereof is provided with a cross arm 11, to the opposite ends of which are secured links 12, which links are in turn pivotally secured to collars 13 on the axle 2 and it will be readily seen that when the steering shaft 9 is rotated, the axle 2 will be swung on the fifth wheel and the course of the vehicle changed.

The steering shaft 9 is held in a vertical position by extending the lower portion of the shaft through a bar 14 extending across the frame 1, while the upper end thereof is introduced through a socket on the end of a brace arm 16, the lower end of said arm being secured to the frame 1 and the steering shaft is held against longitudinal movement by means of a collar 17, which is secured to the steering shaft and in position to rest on the bar 14.

Extending laterally across the frame 1 and secured to the lower edge thereof, is a supporting shaft 18, on which are pivotally mounted standards 19, one of which is provided with an extension 20, below the pivotal point of said standard. Secured to the upper ends of said standards, is a seat 21, the back of said seat extending substantially in vertical alinement with the standards, while the seat portion proper extends forwardly thereof and is reinforced by means of braces 32, the ends of which are secured, respectively, to the forward edge of the seat portion and the standard 19.

The rear axle 3 is provided with cranked portions 23 and 24, to which are pivotally secured pitmen 25 and 26, respectively, said pitmen being pivotally secured at their opposite ends to the standard 19, the pitman 25 being secured to the standard above the shaft 18, while the pitman 26 is secured to the lower end of the extension 20, said pitman being secured to opposite sides of said standard and by oppositely disposing the cranks 23 and 24, it will be seen that when the seat 21 is moved back and forth, the standard 19 having the extension thereon, will act as a walking beam for said pitmen and impart rotating motion to the shaft 3 and, as the wheels 8 are fixed to said shaft, the vehicle will be propelled forwardly or rearwardly.

The occupant of the seat imparts rocking motion to the standard 19 by first throwing the weight of the body forwardly, which will give a pull to the pitman 25 and a thrust to the pitman 26 and when the seat has moved forwardly its full stroke, the occupant imparts rearward movement of the seat by placing the feet on the bar 14, or other stationary portion of the vehicle and forcing the body rearwardly, the continued swinging movement of the body accordingly increasing the speed of the vehicle.

It will thus be seen that I have provided a very cheap and economical form of vehicle and one that may be readily propelled by the movement of the body of the occupant of the vehicle and it will likewise be seen that said vehicle may be easily guided by employing the mechanism as shown.

What I claim is:

A vehicle of the class described, comprising a body, a front and rear axle for said body, supporting wheels on said axles, the wheels on the rear axle being fixed thereto, said rear axle having oppositely disposed cranks, a shaft arranged transversely of the body in advance of the rear axle, standards pivotally connecting the shaft adjacent the ends thereof, a standard pivotally connecting the shaft intermediate the length of the shaft, the intermediate standard being provided with an extension depending beneath the shaft, a seat fixed to the free ends of all the standards, a pitman pivotally connecting one of the cranks of the rear axle and in pivotal engagement with the intermediate standard above the shaft and a second pitman pivotally engaging the second crank of the rear axle and the extension of the intermediate standard.

In testimony whereof I have signed my name to this specification in the presence of two subscribing witnesses.

GUSTAV SIMON.

Witnesses:
   Frank M. Hueber,
   James Hoge.